(12) United States Patent
Danielson

(10) Patent No.: US 7,697,237 B1
(45) Date of Patent: Apr. 13, 2010

(54) SHIELDED COPPER-DIELECTRIC FLEXURE FOR DISK DRIVE HEAD SUSPENSIONS

(75) Inventor: Reid C. Danielson, Cokato, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 465 days.

(21) Appl. No.: 11/622,167

(22) Filed: Jan. 11, 2007

(51) Int. Cl.
*G11B 5/48* (2006.01)

(52) U.S. Cl. .................. 360/245.9; 380/245.3
(58) Field of Classification Search .............. 360/245.9, 360/245.3, 245.5, 246, 245.8; 174/254, 255, 174/260; 439/67, 77
See application file for complete search history.

(56) References Cited

U.S. PATENT DOCUMENTS

| | | | | |
|---|---|---|---|---|
| 4,564,723 A | * | 1/1986 | Lang | 174/36 |
| 4,819,094 A | * | 4/1989 | Oberg | 360/245.9 |
| 5,490,027 A | | 2/1996 | Hamilton et al. | |
| 5,491,597 A | * | 2/1996 | Bennin et al. | 360/245.9 |
| 5,737,152 A | * | 4/1998 | Balakrishnan | 360/245.9 |
| 5,754,369 A | * | 5/1998 | Balakrishnan | 360/264.2 |
| 5,796,552 A | * | 8/1998 | Akin et al. | 360/264.2 |
| 5,871,655 A | * | 2/1999 | Lee et al. | 216/22 |
| 5,981,043 A | * | 11/1999 | Murakami et al. | 428/209 |
| 5,995,328 A | | 11/1999 | Balakrishnan | |
| 6,100,582 A | | 8/2000 | Omote et al. | |
| 6,288,877 B1 | * | 9/2001 | Khan et al. | 360/245.9 |
| 6,399,899 B1 | * | 6/2002 | Ohkawa et al. | 174/261 |
| 6,487,048 B1 | * | 11/2002 | Dunn | 360/245.9 |
| 6,587,310 B1 | | 7/2003 | Bennin et al. | |
| 6,614,624 B2 | * | 9/2003 | Shiraishi et al. | 360/245.9 |
| 6,839,202 B2 | * | 1/2005 | Zhou | 360/234.5 |
| 7,223,922 B2 | * | 5/2007 | Bandy et al. | 174/254 |
| 7,336,446 B2 | * | 2/2008 | Kanagawa et al. | 360/245.9 |
| 2003/0202281 A1 | | 10/2003 | Zhou | |
| 2004/0252413 A1 | * | 12/2004 | Nishiyama | 360/245.9 |
| 2005/0122627 A1 | | 6/2005 | Kanagawa et al. | |

* cited by examiner

*Primary Examiner*—William J Klimowicz
(74) *Attorney, Agent, or Firm*—Faegre & Benson LLP

(57) ABSTRACT

An integrated lead disk drive suspension flexure including a gimbal region including gimbal spring arms having conductive spring metal traces embedded within dielectric between a pair of conductive metal shields. The traces function as the spring arms of the gimbal spring arms, wherein the gimbal spring arms are free from spring metal layers opposite the pair of conductive metal shields from the spring metal trace supports.

11 Claims, 4 Drawing Sheets

SHIELDED COPPER-DIELECTRIC FLEXURE FOR DISK DRIVE HEAD SUSPENSIONS

FIELD OF THE INVENTION

The invention relates generally to flexures of the type used in disk drive head suspensions. In particular, the invention is an integrated lead flexure and method of manufacture.

BACKGROUND OF THE INVENTION

Wireless or integrated lead flexures of the type used in magnetic disk drive head suspension assemblies and associated manufacturing methods are known and disclosed, for example, in the following U.S. Patents.

| Inventor | U.S. Pat. No./Publication No. |
| --- | --- |
| Hamilton et al. | 5,490,027 |
| Balakrishnan | 5,995,328 |
| Omote et al. | 6,100,582 |
| Bennin et al. | 6,587,310 |
| Kangawa et al. | 2005/0122627 |

There remains, however, a continuing need for improved flexures and methods of manufacture. In particular, there is a need for flexures having both high performance mechanical characteristics and high performance electrical signal transmission characteristics. To be commercially viable the flexures must be capable of being efficiently manufactured to a high degree of precision.

SUMMARY OF THE INVENTION

The present invention is an improved integrated lead flexure having high performance mechanical and electrical specifications. The flexure can also be efficiently manufactured. One embodiment of the flexure includes a plurality of head bond pads and a plurality of spring metal trace supports extending from the head bond pads along gimbal spring arms. A layer of high conductivity metal plating is on the spring metal trace supports. Dielectric surrounds at least portions of the plated spring metal trace supports along the gimbal spring arms. A first conductive metal shield is located on a first side of at least portions of the plated spring metal trace supports at the gimbal spring arms and at a slider mounting region. The first conductive shield is spaced from the plated spring metal trace supports by the dielectric. A second conductive metal shield is located on a second side of at least portions of the plated spring metal trace supports at the gimbal spring arms. The second conductive shield is spaced from the plated spring metal trace supports by the dielectric.

Another embodiment of the invention includes a spring metal trace support extending along the slider mounting region. A layer of high conductivity metal plating is on the spring metal trace support extending along the slider mounting region. A layer of dielectric is between the spring metal trace support extending along the slider mounting region and the first conductive metal shield at the slider mounting region.

Yet another embodiment of the invention includes a plurality of spring metal trace supports extending from the spring metal trace supports at the gimbal spring arms along a base region. A layer of high conductivity metal plating is on the spring metal trace supports along the base region. A dielectric layer surrounds at least portions of the plated spring metal trace supports along the base region. A first conductive metal shield is on a first side of at least portions of the plated spring metal trace supports along the base region. The first conductive shield along the base region is spaced from the plated spring metal trace supports by the dielectric. A second conductive metal shield is on a second side of at least portions of the plated spring metal trace supports along the base region. The second conductive shield along the base region is spaced from the plated spring metal trace supports by the dielectric.

DETAILED DESCRIPTION OF THE PREFERRED EMBODIMENTS

Figure 1:
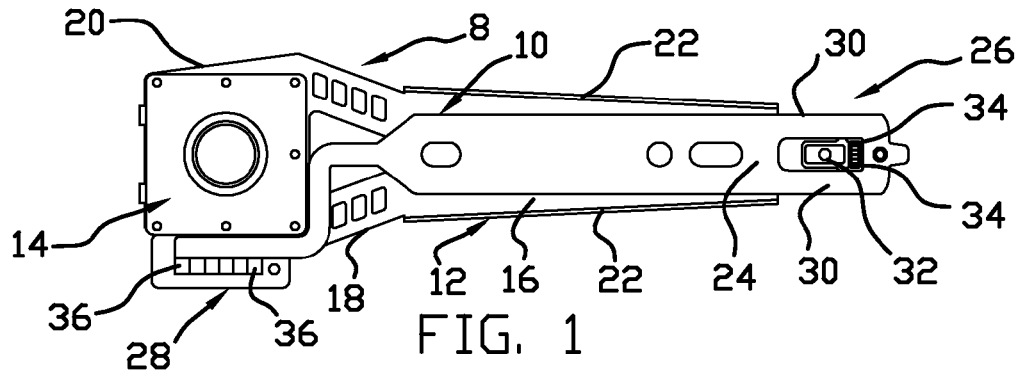
FIG. 1 is a plan view of a head suspension assembly including a flexure in accordance with one embodiment of the present invention.

A suspension assembly 8 including a shielded copper-dielectric flexure 10 in accordance with one embodiment of the present invention is illustrated in FIG. 1. Suspension 8 is a three-piece assembly in the illustrated embodiment, and includes a load beam 12 and base plate 14 in addition to the flexure 10. Load beam 12, which is typically formed from stainless steel, includes a beam region 16, hinge or spring region 18 and mounting region 20. Rails 22 are formed on the side edges of the beam region 16. Base plate 14 is welded to the mounting region 20 at the proximal end of the load beam 12.

Flexure 10 is an integrated lead or wireless flexure and includes a mounting or base region 24 that is welded or otherwise attached to the beam region 16 of load beam 12, a gimbal region 26 at its distal end, and a tail 28 extending from the proximal end of the base region. The gimbal region 26 includes a pair of laterally-spaced spring arms 30 extending from the base region 24, and a slider mounting region 32 that extends from and is supported by and between the spring arms. A plurality of head bond pads 34 are located adjacent to the slider mounting region 32. A plurality of terminal pads 36 are located on the proximal end of the flexure tail 28. Traces (not visible in FIG. 1 and described below) extend along the flexure 10 between the head bond pads 34 and terminal pads 36.

Figure 7:
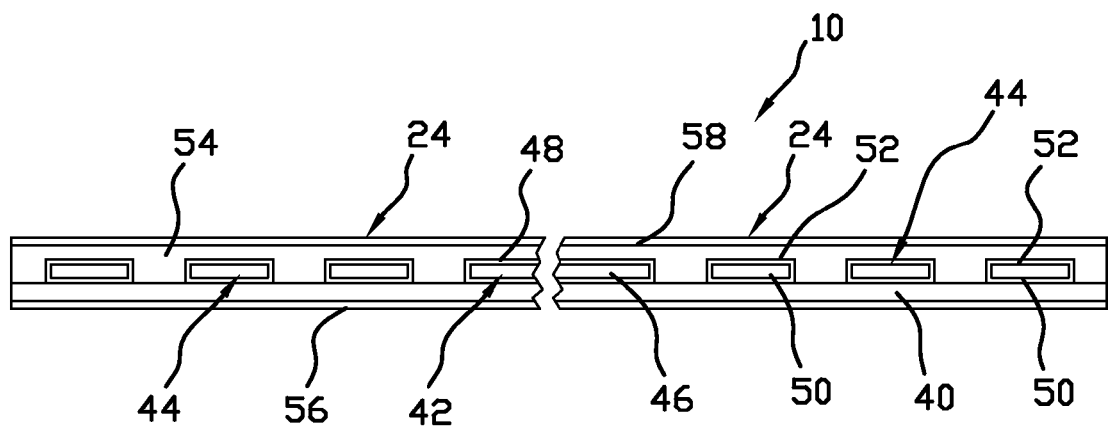
FIG. 7 is a cross sectional illustration of a portion of the flexure shown in FIG. 2, taken at line 7-7 in FIG. 2.

The general structure of flexure 10 can be described in greater detail with respect to FIG. 7 which is a cross sectional illustration of the base region 24. As shown, the base region 24 of flexure 10 includes a core 42 and a plurality of traces 44 on a dielectric base insulation layer 40. Core 42 is generally centrally located in the base region 24. The traces 44 are laterally spaced on the opposite sides of the core 42 in the illustrated embodiment. Core 42 includes a spring metal support 46 plated with conductive metal 48 in the illustrated embodiment, although other embodiments are described below. Similarly, traces 44 include a spring metal support 50 plated with conductive metal 52. In one embodiment of the invention the spring metal supports 46 and 50 are both beryllium copper (BeCu) alloy. Conductive metal plating 48 and 52 can be gold or copper. Other metals and metal alloys can be used for core 42 and traces 44 in other embodiments (not shown). A dielectric covercoat 54 overlays the surfaces of the core 42 and traces 44 that are not covered by the base insulation layer 40. Base insulation layer 40 and covercoat 54 thereby combine to provide an insulation layer that embeds or surrounds the sides of core 42 and traces 44. First and second conductive metal shield layers 56 and 58 overlay the base insulation layer 40 and covercoat 54, respectively, on the opposite sides of the core 42 and traces 44. Metal shield layers 56 and 58 can be copper, copper alloy or other metals or materials having suitable conductivity.

Spring metal support 46 of core 42 and spring metal supports 50 of traces 44 provide substantial mechanical structural properties to the base region 24 of flexure 10. As is described below, the spring metal supports 50 of traces 44 also similarly provide substantial mechanical structural properties to the arms 30 and slider mounting region 32 of gimbal 26. However, some metals such as BeCu that have mechanical properties suitable for the mechanical function of the structure do not have electrical properties suitable for the electrical functions of the components. BeCu, for example, is a relatively poor conductor. The conductive metal plating 48 and 52 on the spring metal support 46 of core 42 and the spring metal support 50 of traces 44, respectively, provides the desired electrical properties for the core 42 and traces 44. In other embodiments (not shown) where both the mechanical and electrical properties of the core 42 and/or traces 44 can be achieved by a single material structure, the conductive metal plating is not required. In still other embodiments (not shown) in which the core 42 is not used for electrical signal transmission, the core can be a single material structure such as BeCu that achieves the desired mechanical properties (e.g., the BeCu need not have the conductive metal plating in these embodiments). In the embodiments of the invention shown, the spring metal supports 46 of core 42 and spring metal supports 50 of traces 44, in combination with the base insulation layer 40, covercoat 54 and metal shield layers 56 and 58, provide the mechanical properties required by the flexure 10 and in particular the resilient mechanical support properties required of the gimbal region 26. This embodiment of the invention is free of stainless steel or other spring metal layers commonly present as base layers in head suspension flexures.

Figure 2:
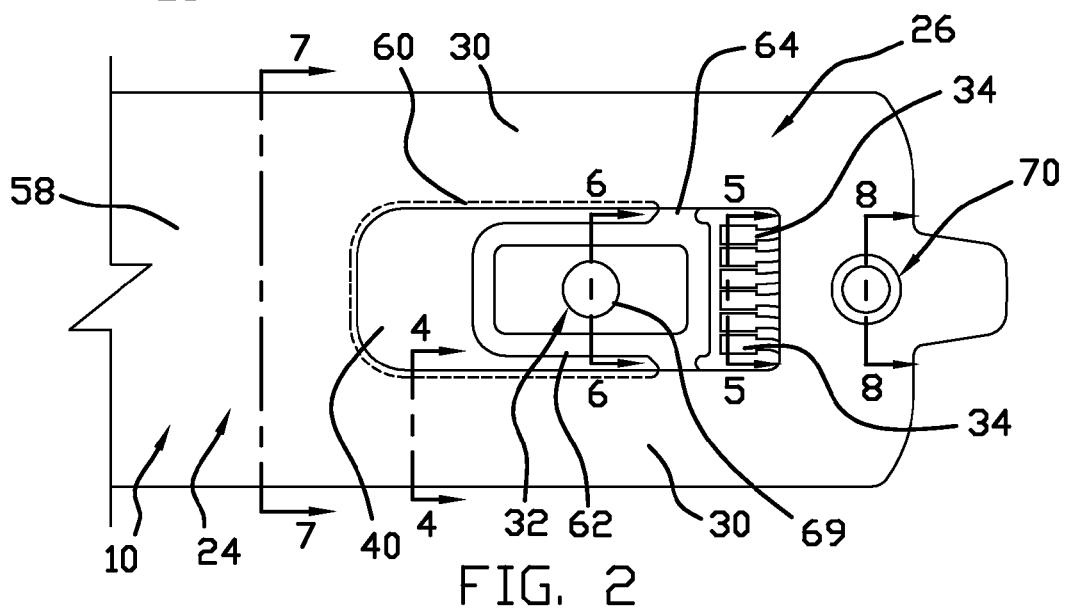
FIG. 2 is a detailed plan view of a distal end or gimbal portion of the flexure shown in FIG. 1.
Figure 3:
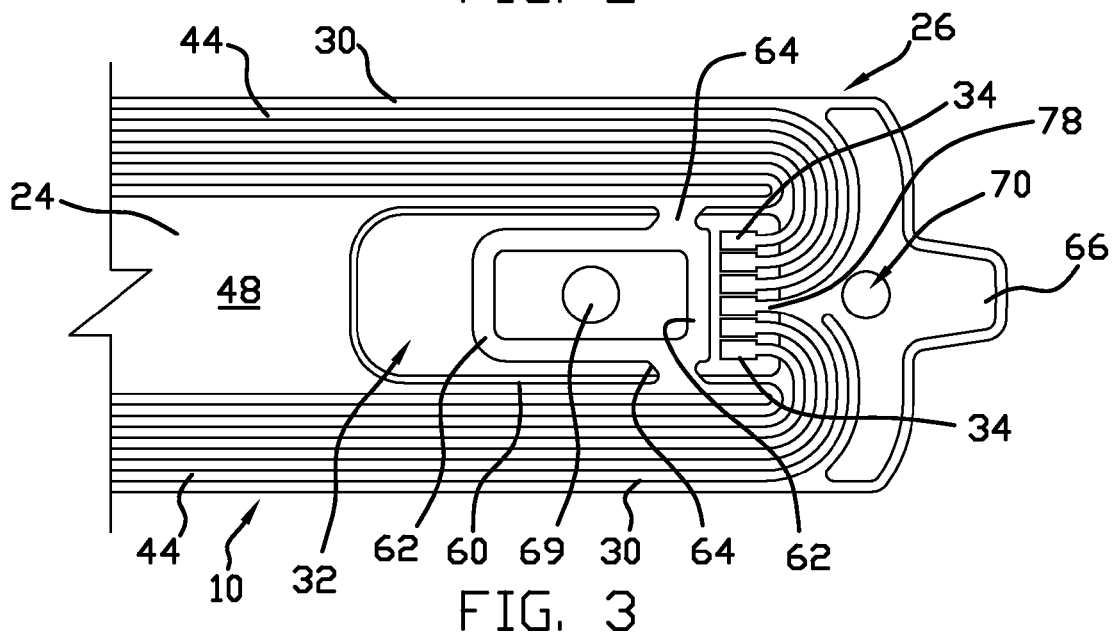
FIG. 3 is a detailed view of the gimbal portion shown in FIG. 2 with the upper shield and covercoat layers removed.
Figure 4:
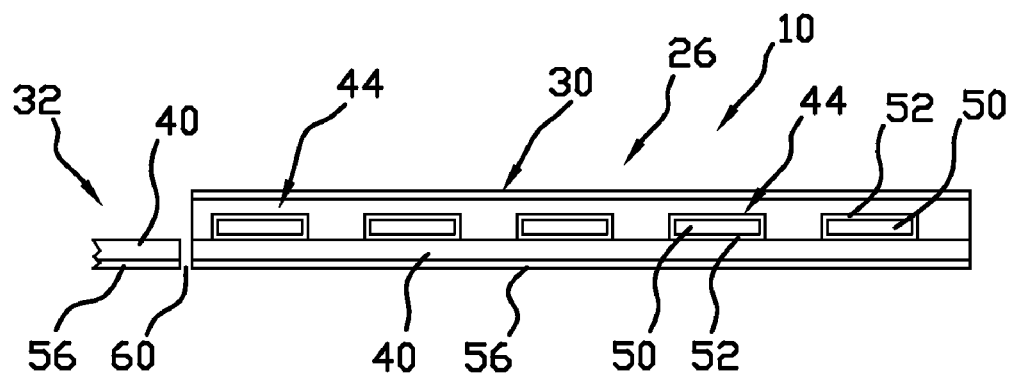
FIG. 4 is a cross sectional illustration of a portion of the flexure shown in FIG. 2, taken at line 4-4 in FIG. 2.
Figure 5:
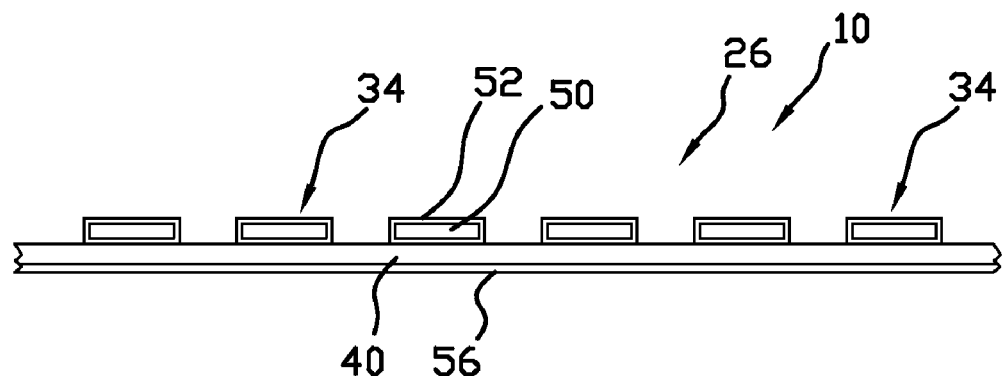
FIG. 5 is a cross sectional illustration of a portion of the flexure shown in FIG. 2, taken at line 5-5 in FIG. 2.
Figure 6:
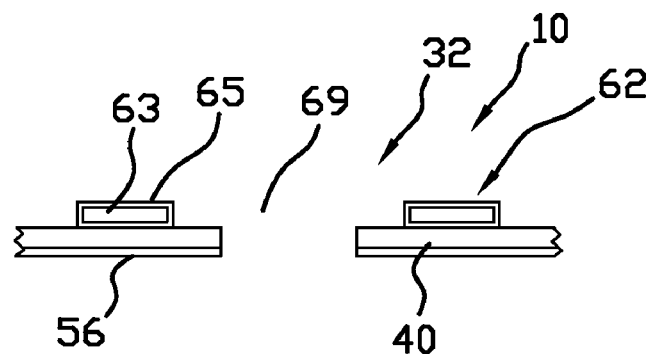
FIG. 6 is a cross sectional illustration of a portion of the flexure shown in FIG. 2, taken at line 6-6 in FIG. 2.

The structures of the different portions of gimbal region 26 can be described with reference to FIGS. 2-6. FIG. 2 is a detailed plan view of the gimbal region 26 from the side shown in FIG. 1. FIG. 3 is a plan view of the gimbal region 26 from the side shown in FIG. 1, with the second conductive metal shield layer 58 and the covercoat layer 54 removed. As shown in FIGS. 2 and 3, the second conductive shield layer 58 and covercoat 54 are not present over the slider mounting region 32, and an aperture 60 extends through portions of the base insulation layer 40 and first metal shield layer 56 (not visible in FIGS. 2 and 3). In the embodiment shown, the aperture 60 is a generally U-shaped slot, and the slider mounting region 32 is a rectangular tongue extending from and between the arms 30. In other embodiments (not shown) the aperture 60 and slider mounting region 32 have other shapes and configurations. A ring-shaped support 62 extends around a portion of the slider mounting region 32 and is connected to traces 44 on the arms 30 by links 64. Support 62 and links 64 can have the same structural components as the core 42 and/or traces 44 described above (e.g., spring metal supports 63 and conductive metal plating 65 as shown in FIG. 6). This configuration of the slider mounting region 32 and its connections to arms 30 by link 64 allow the slider mounting region to move or gimbal in pitch and roll direction with respect to the arms. A head slider (not shown) can be bonded or otherwise attached to the slider mounting region 32 (e.g., to the ring-shaped support 62) and the terminals on the head slider electrically connected to the bond pads 34. Conventional or otherwise known head sliders and bonding and electrical connection processes and technology can be used for these purposes.

An aperture 69 extends through the first metal shield layer 56 and base insulation layer 40 of the slider mounting region 32 in the embodiment shown. Aperture 69 can be used as a recess for receiving a load point dimple (not shown) extending from load beam 8.

As shown in FIG. 3, the bond pads 34 are connected to traces 44 that extend along the arms 30 to the flexure base region 24. Although not shown, the traces 44 also extend along the flexure base region 24 to the tail 28, and along the tail to the terminal pads 36 (FIG. 1). Links 64 connect the ring-shaped support 62 to the core 42 through traces 44 in the illustrated embodiment. In other embodiments (not shown) the links 64 are not connected to core 42. The ring-shaped support 62 is also connected to a distal core section 66 through a bond pad 34 and link 78. Core section 66 and link 78 can have the same structural components as the core 42 and/or traces 44 described above.

Figure 8:
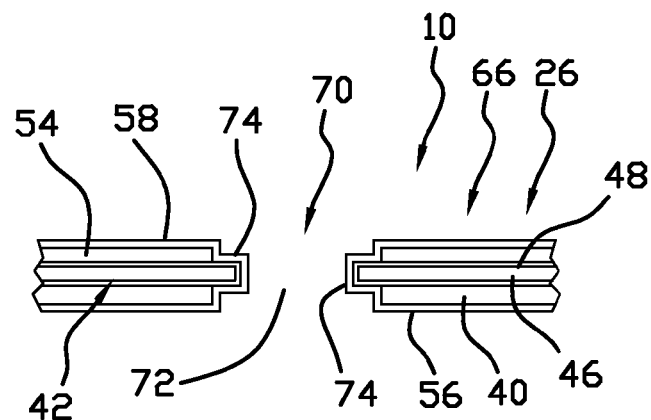
FIG. 8 is a cross sectional illustration of a portion of the flexure shown in FIG. 2, taken at line 8-8 in FIG. 2.

FIG. 8 is a cross sectional illustration of a grounding feature or interconnect 70 that can be formed on flexure 10 to electrically interconnect metal shield layers 56 and/or 58 to core 42 or one or more of traces 44. In the embodiment shown in FIG. 2, interconnect 70 is located on the distal tip of the gimbal region 26 and electrically interconnects core 42 to both metal shield layers 56 and 58. An aperture 72 extends through both the spring metal support 46 and metal plating 48 of the core 42, as well as through base insulation layer 40, covercoat 54 and metal shield layers 56 and 58. A conductive metal plating layer 74 extends over the interior surfaces of the aperture 72 between the metal shield layers 56 and 58, and in contact with the core 42. In other embodiments (not shown), interconnect 70 connects the core 42 to either but not both of metal shield layers 56 and 58. In these embodiments the aperture 72 need not extend through the flexure 10. In still other embodiments (not shown), interconnect 70 electrically connects the metal shield layers 56 and 58, but not core 42 (e.g., an insulation layer can be located between the metal plating layer 74 and the core 42). Interconnect 70 can also be located at other positions on flexure 10. Interconnects such as 70 can also be used to electrically connect traces 44 to one or more of metal shield layer 56 and 58.

Other embodiments of flexure 10 (not shown) can include layers of material and structures in addition to those of flexure 10 and described above. For example, additional layers of conductive material (e.g., ground planes) can be incorporated into the flexure. Similarly, additional layers of metal (e.g., nickel and/or gold) can be plated or otherwise applied to the traces. Dimples, formed offsets and rails are examples of structures that can be incorporated onto the flexure. Furthermore, portions of the flexure need not include all the structures of flexure 10 described above. For example, the base region of the flexure need not include the core. The metal shield layers need not be present over portions of the flexure not having traces. Similarly, one or both of the metal shield layers can be not present over portions of the traces.

FIGS. 9A-9E illustrate a sequence of steps of a manufacturing process in accordance with one embodiment of the invention for manufacturing a flexure 110. Flexure 110 can be similar or substantially the same as flexure 10 described above, and similar reference numbers are used to identify similar structures and elements. FIGS. 9A-9E illustrate a portion of the gimbal region arms 130, but as described below, all the other portions of flexure 110 can also be manufactured using the process.

Figure 9A:
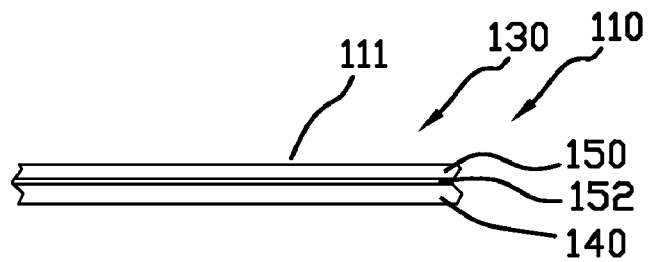
FIGS. 9A-9E illustrate a sequence of steps of a manufacturing process in accordance with one embodiment of the invention for manufacturing a flexure similar to that shown in FIG. 2.

As shown in FIG. 9A, the manufacturing process uses a laminate 111 having a base dielectric or insulation layer 140, a BeCu or other spring metal layer 150 and a copper or other relatively highly conductive metal layer 152 between the insulation layer and spring metal layer. Laminates such as 111 are commercially available.

Figure 9B:
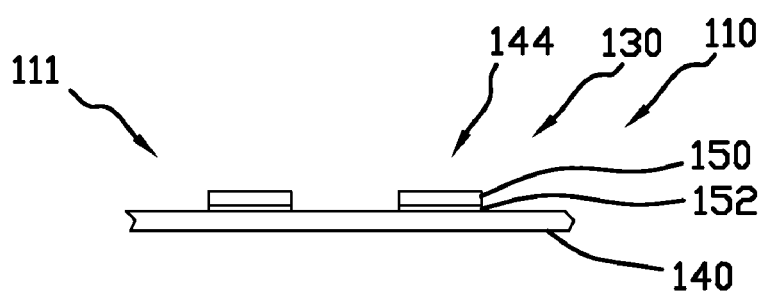

FIG. 9B illustrates the gimbal region arms 130 after the laminate 111 is processed to form portions of traces 144. As shown, the portions of traces 144 are formed by removing portions of the spring metal layer 150 and conductive metal layer 152 to leave strips of the spring metal layer overlaying strips of the conductive metal layer at the locations of the traces. Conventional photolithography and chemical etching processes are used to form the portions of flexure 110 shown in FIG. 9B in one embodiment of the invention.

Figure 9C:
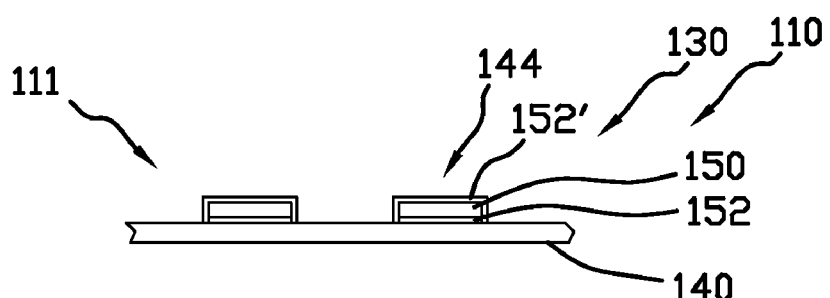

FIG. 9C illustrates the gimbal region arms 130 after conductive metal layer 152' is plated onto the exposed outer surfaces of the portions of spring metal layer 150 and conductive metal layer 152. The conductive metal layer 152', along with conductive metal layer 152, effectively surrounds the sides of the spring metal layer 150 to form the traces 144. The conductive metal layer 152' can be the same metal or other material as conductive metal layer 152. Alternatively, conductive metal layer 152' can be a metal or material that is different than that of conductive metal layer 152. Conventional electroplating processes are used to coat the conductive metal layer 152' onto the portions of the traces 144 shown in FIG. 9C in one embodiment of the invention.

Figure 9D:
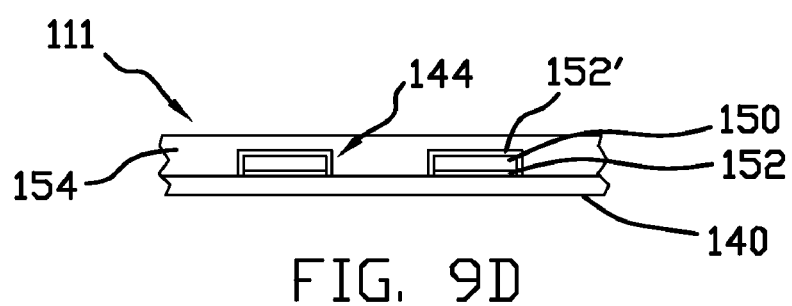

FIG. 9D illustrates the gimbal region arms 130 after a dielectric covercoat 154 is applied over the traces 144 and base insulating layer 140. As shown, the covercoat 154 along with the base insulating layer 140 effectively surrounds the sides of the traces 144. Conventional coating, curing and photolithography processes are used to form the covercoat 154 onto the insulating layer 140 and traces 144 in one embodiment of the invention.

Figure 9E:
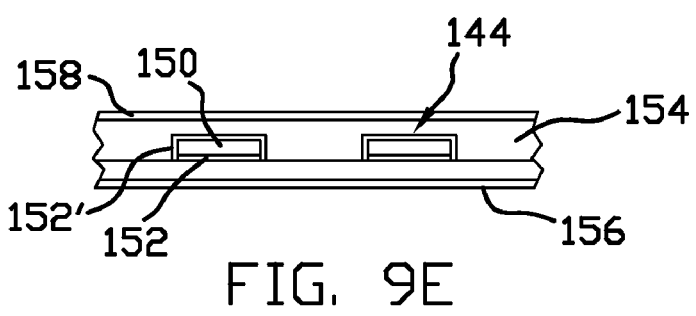

FIG. 9E illustrates the gimbal region arms 130 after the metal shield layers 156 and 158 have been applied to the exposed outer surfaces of the base insulating layer 140 and covercoat 154, respectively. Conventional sputtering processes are used to form the metal shield layers 156 and 158 in one embodiment of the invention.

Apertures such as 60, 69 and 72 can be formed on a layer-by-layer basis during the process steps described above in connection with FIGS. 9A-E. Alternatively, the apertures can be formed by processes such as mechanical boring or chemical etching following the fabrication of some or all of the layers of material through which the aperture is to extend.

Process steps similar to those described above in connection with FIGS. 9A-9E can be used to form other portions (not shown in FIGS. 9A-9E) of the gimbal region such as the slider mounting region and the head bond pads 34, as well as other portions of the flexure (also not shown in FIGS. 9A-9E) such as the tail and base region. For example, the covercoat and upper shield layer can be not formed on the slider mounting region and head bond pads of the gimbal region (e.g., the regions masked off) during the fabrication of the flexure. Alternatively, the covercoat and/or upper shield layer can be initially formed on the gimbal region, and subsequently removed (e.g., by etching processes). Other portions of the flexure having the spring metal layer and/or the conductive metal layer (e.g., the core, ring on the slider mounting region and links), the first and/or second metal shield layers (e.g., flexure base region and slider mounting region) and/or the covercoat (e.g., the slider mounting region) can be formed at the same time and using the same processes and materials as those of the corresponding layers and structures in the gimbal region arms described above. Other known or otherwise conventional manufacturing processes (e.g., additive processes) can also be used to manufacture the flexure.

The flexure provides superior mechanical and electrical properties. It can also be efficiently manufactured.

Although the invention has been described with reference to preferred embodiments, those skilled in the art will recognize that changes can be made in form and detail without departing from the spirit and scope of the invention.

What is claimed is:

1. A head suspension flexure, including:
   a slider mounting region;
   a plurality of head bond pads;
   a pair of gimbal spring arms on opposite sides of the slider mounting region, and wherein each of the gimbal spring arms includes:
   a plurality of spring metal trace supports extending from the head bond pads along gimbal spring arms;
   high conductivity metal plating on the spring metal trace supports;
   dielectric surrounding at least portions of the plated spring metal trace supports along the gimbal spring arms;
   a first conductive metal shield on a first side of at least portions of the plated spring metal trace supports at the gimbal spring arms; and
   a second conductive metal shield on a second side of at least portions of the plated
   spring metal trace supports at the gimbal spring arms, the second conductive shield spaced from the plated spring metal trace supports by the dielectric; and
   wherein the gimbal spring arms are free from spring metal layers opposite the first and second metal shield from the spring metal trace supports.

2. The head suspension flexure of claim 1 and further including:
   a spring metal trace support extending along the slider mounting region;
   high conductivity metal plating on the spring metal trace support extending along the slider mounting region; and
   dielectric between the spring metal trace support extending along the slider mounting region and the first conductive metal shield at the slider mounting region.

3. The head suspension flexure of claim 1 and further including:
   a plurality of spring metal trace supports extending from the spring metal trace supports at the gimbal spring arms along a base region;
   high conductivity metal plating on the spring metal trace supports along the base region;
   dielectric surrounding at least portions of the plated spring metal trace supports along the base region;
   a first conductive metal shield on a first side of at least portions of the plated spring metal trace supports along the base region, the first conductive shield along the base region spaced from the plated spring metal trace supports by the dielectric; and a second conductive metal shield on a second side of at least portions of the plated spring metal trace supports along the base region, the second conductive shield along the base region spaced from the plated spring metal trace supports by the dielectric.

4. The head suspension flexure of claim 3 and further including:
a plurality of spring metal trace supports extending from the spring metal trace supports at the base region along a tail to terminal pads;
high conductivity metal plating on the spring metal trace supports along the tail;
dielectric surrounding at least portions of the plated spring metal trace supports along the tail;
a first conductive metal shield on a first side of at least portions of the plated spring metal trace supports along the tail, the first conductive shield along the tail spaced from the plated spring metal trace supports by the dielectric; and
a second conductive metal shield on a second side of at least portions of the plated spring metal trace supports along the tail, the second conductive shield along the tail spaced from the plated spring metal trace supports by the dielectric.

5. The head suspension flexure of claim 3 wherein the base region includes a core within the dielectric, the core comprising:
a spring metal support; and
high conductivity metal plating on the spring metal support.

6. The head suspension flexure of claim 1 wherein:
the spring metal trace supports include BeCu; and
the high conductivity metal plating includes copper, copper alloy or gold.

7. The head suspension flexure of claim 1 wherein the flexure is free of a stainless steel spring metal base layer.

8. A head suspension flexure, including:
a slider mounting region;
a plurality of head bond pads on the slider mounting region;
a pair of gimbal spring arms on opposite sides of the slider mounting region, and wherein each of the gimbal spring arms includes:
a plurality of conductive spring metal traces extending from the head bond pads along gimbal spring arms;
dielectric surrounding at least portions of the spring metal traces along the gimbal spring arms;
a first conductive metal shield on a first side of at least portions of the spring metal traces at the gimbal spring arms, the first conductive shield spaced from the spring metal traces by the dielectric;
a second conductive metal shield on a second side of at least portions of the spring metal traces at the gimbal spring arms, the second conductive shield spaced from the spring metal traces by the dielectric; and
wherein the gimbal spring arms are free from spring metal layers opposite the first and second metal shield from the spring metal traces.

9. The head suspension flexure of claim 8 and further including a plurality of spring metal links extending from the gimbal spring arms to the slider mounting region.

10. The head suspension flexure of claim 9 wherein the slider mounting region includes spring metal structure connected to the spring metal links.

11. The head suspension flexure of claim 10 wherein the slider mounting region includes:
a conductive metal shield layer; and
a dielectric layer between the conductive metal layer and the spring metal structure.

* * * * *